US012584418B2

(12) United States Patent
Gao et al.

(10) Patent No.: US 12,584,418 B2
(45) Date of Patent: Mar. 24, 2026

(54) CMC COMPONENT WITH COOLING CAVITY

(71) Applicant: RTX Corporation, Farmington, CT (US)

(72) Inventors: Cheng Gao, Farmington, CT (US); Howard J. Liles, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/806,506

(22) Filed: Aug. 15, 2024

(65) Prior Publication Data

US 2026/0049558 A1 Feb. 19, 2026

(51) Int. Cl.
| | |
|---|---|
| *F01D 11/00* | (2006.01) |
| *C04B 35/628* | (2006.01) |
| *C04B 35/80* | (2006.01) |
| *F02C 7/12* | (2006.01) |

(52) U.S. Cl.
CPC ...... *F01D 11/005* (2013.01); *C04B 35/62844* (2013.01); *C04B 35/80* (2013.01); *F02C 7/12* (2013.01); *C04B 2235/5256* (2013.01); *C04B 2235/6028* (2013.01); *C04B 2235/612* (2013.01); *F05D 2230/31* (2013.01); *F05D 2260/20* (2013.01); *F05D 2300/6033* (2013.01)

(58) Field of Classification Search
CPC ........ F01D 11/005; F01D 11/08; F01D 11/12; F01D 11/122; F01D 11/125; F01D 11/14; F01D 11/16; F01D 11/18
See application file for complete search history.

(56) References Cited

U.S. PATENT DOCUMENTS

| | | | | |
|---|---|---|---|---|
| 10,689,998 | B2 * | 6/2020 | Stapleton | F01D 11/08 |
| 10,753,221 | B2 * | 8/2020 | Barker | F01D 25/246 |
| 10,815,810 | B2 * | 10/2020 | Barker | F01D 11/005 |
| 10,822,985 | B2 | 11/2020 | Clark et al. | |
| 10,968,761 | B2 * | 4/2021 | Barker | F01D 11/005 |
| 11,174,752 | B2 * | 11/2021 | Dyson | C04B 35/515 |
| 11,326,470 | B2 * | 5/2022 | Dyson | F01D 9/02 |
| 11,365,635 | B2 | 6/2022 | Read et al. | |
| 11,732,604 | B1 * | 8/2023 | Freeman | F01D 25/12 415/228 |
| 11,746,669 | B1 | 9/2023 | Romanov | |
| 11,965,427 | B1 * | 4/2024 | Clark | F01D 11/003 |

(Continued)

OTHER PUBLICATIONS

European Search Report dated Dec. 15, 2025 issued in corresponding application 25193526.8.

*Primary Examiner* — Craig Kim

(74) *Attorney, Agent, or Firm* — Millen, White, Zelano & Branigan, P.C.; Brion P. Heaney

(57) ABSTRACT

A method is described for introducing cooling cavities into CMC components beneath flanges such as T-shaped flanges within the CMC components. During layup, preform is made having flanges formed from a Y-shaped weave in which plies of woven ceramic fiber tows form a radial flange section extending from a base of the preform and two bifurcated arms. The plies of the two bifurcated arms and plies of the base form a cooling cavity having a triangular cross section beneath the flange. Cooling fluid inlet passages are provided to permit cooling fluid to enter the cooling cavity and thereby cool the internal region of the CMC component to reduce formation of thermal stresses.

20 Claims, 3 Drawing Sheets

(56)                References Cited

U.S. PATENT DOCUMENTS

| 11,982,187 | B1 * | 5/2024 | Rogers | F01D 25/24 |
| 12,044,132 | B1 * | 7/2024 | Banhos | F01D 25/14 |
| 12,078,081 | B1 * | 9/2024 | Banhos | F01D 5/284 |
| 12,459,870 | B2 * | 11/2025 | Erb | C04B 35/62218 |
| 2016/0185092 | A1 * | 6/2016 | Chamberlain | B29C 65/564 156/242 |
| 2016/0305265 | A1 * | 10/2016 | Stapleton | F02C 3/04 |
| 2017/0107840 | A1 * | 4/2017 | Stapleton | F02C 3/04 |
| 2017/0204742 | A1 * | 7/2017 | Swift | F01D 25/12 |
| 2019/0224938 | A1 * | 7/2019 | Feie | B29D 99/0005 |
| 2019/0368366 | A1 | 12/2019 | Clark et al. | |
| 2020/0072069 | A1 | 3/2020 | Clark et al. | |
| 2020/0072127 | A1 * | 3/2020 | Blaney | F01D 11/005 |
| 2021/0131302 | A1 * | 5/2021 | Roy Thill | F01D 11/08 |
| 2021/0189889 | A1 * | 6/2021 | Decesare | F01D 5/282 |
| 2021/0189901 | A1 * | 6/2021 | Dyson | C04B 38/0615 |
| 2021/0199013 | A1 * | 7/2021 | Read | B32B 18/00 |
| 2022/0154587 | A1 * | 5/2022 | Sobanski | F01D 9/041 |
| 2025/0003589 | A1 * | 1/2025 | Banhos | B32B 5/26 |
| 2025/0116193 | A1 * | 4/2025 | Roach | F01D 5/02 |
| 2025/0116197 | A1 * | 4/2025 | Banhos | F01D 5/284 |
| 2025/0320167 | A1 * | 10/2025 | Dunn | C04B 41/4523 |

* cited by examiner

CMC COMPONENT WITH COOLING CAVITY

FIELD OF THE INVENTION

The present disclosure relates generally to methods for manufacturing ceramic matrix composites (CMCs). In particular, the present disclosure concerns manufacturing CMC components with internal cooling cavities.

BACKGROUND OF THE INVENTION

Gas turbine engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high temperature gas flow (flow path components). Therefore, it desirable that such components be made of heat resistant materials such as ceramic matrix composites (CMCs). CMC components can withstand much higher operating temperatures than components composed of superalloys. However, CMC components have comparably lower thermal conductivity. To increase their operational lifespans, precautions can be taken to cool CMC components by exposing the components to a flow of cooling fluid (e.g., air).

In some cases, CMC components, such as blade outer air seals (BOAS), can exhibit flanges such as T-shaped flanges (e.g., radial flanges) that extend from a base structure as load bearing features. The region beneath such flanges has an increased material thickness in comparison to other portions of the component. These greater thicknesses render cooling more difficult and result in the formation of higher thermal gradients which in turn result in higher through-thickness and in-plane thermal stresses. The in-plane direction refers to the direction parallel to fiber orientation of the CMC fabric material that forms the CMC component of the CMC component. On the other hand, the through-thickness direction refers to the direction normal to the CMC fabric material. Thus, for example, in the case of a BOAS, the through-thickness direction is normal to the base structure of the BOAS and the through-thickness thermal gradient is from the surface of the base structure that is exposed to the hot gas path to the back-side of the substrate.

There is thus a continuing need for alternative and/or improved manufacturing methods for providing cooling structures to allow for cooling of CMC components exposed to high temperature gas flow, particularly CMC components exhibiting flanges such as BOAS.

SUMMARY OF THE INVENTION

In general, the present disclosure relates to methods for introducing cooling cavities into CMC components beneath flanges such as T-shaped flanges within the CMC components, and CMC components exhibiting such cooling cavities. In particular, the present disclosure relates to introducing a cooling cavity into a CMC component beneath flanges such as T-shaped flanges thereof during layup of a CMC preform.

The present disclosure is directed, in a first aspect, to a ceramic matrix composite (CMC) component having:

a base having a bottom inner surface and a top outer surface, the base comprising a plurality of ceramic fiber piles, at least one flange structure extending from the top outer surface of the base at a connection region, the flange structure being formed from a Y-weave of a plurality of ceramic fiber piles and having a radial flange section extending upward from the top outer surface of the base and, at the connection region, two arms formed by bifurcation of the plurality of ceramic fiber piles of the Y-weave, a cooling channel beneath the at least one flange structure wherein the cooling channel is positioned at the connection region, and is formed by the two arms of the Y-weave and plies of the base, the cooling channel having a triangular shaped cross section, and at least one cooling fluid inlet passage extending through yjr at least one flange structure to the cooling channel.

In yet another embodiment, the present disclosure is directed to a method of forming a ceramic matrix composite comprising:

laying up a plurality of ceramic fiber plies to form a base bottom inner surface and a top outer surface, providing a plurality of ceramic fiber plies that form at least one flange structure extending from the top outer surface of the base at a connection region, the flange structure being formed from a Y-weave of a plurality of ceramic fiber piles and having a radial flange section extending upward from the top outer surface of the base and, at the connection region, two arms formed by bifurcation of the plurality of ceramic fiber piles of the Y-weave, wherein the base and at least one flange structure form a ceramic matrix composite preform, subjecting the ceramic matrix composite preform to densification to form a ceramic matrix composite, and before or after the densification, providing at least one cooling fluid inlet passage extending through the at least one flange structure to the cooling channel.

In yet another embodiment, the present disclosure is directed to a gas turbine engine having:

a fan section, a compressor section, a combustion section, and a turbine section, the turbine section including at least one rotor and one or more turbine blade(s) extending radially outwardly from the at least one rotor;

a blade outer air seal assembly positioned between the one or more turbine blade(s) and an outer casing to the engine;

the blade outer air seal is formed of a plurality blade outer air seal segments, wherein each blade outer air seal segment comprises a base having a bottom inner surface and a top outer surface, the base comprising a plurality of ceramic fiber piles, at least one flange structure extending from the top outer surface of the base at a connection region, the flange structure being formed from a Y-weave of a plurality of ceramic fiber piles and having a radial flange section extending upward from the top outer surface of the base and, at the connection region, two arms formed by bifurcation of the plurality of ceramic fiber piles of the Y-weave, a cooling channel beneath the at least one flange structure wherein the cooling channel is positioned at the connection region, and is formed by the two arms of the Y-weave and plies of the base, the cooling channel having a triangular shaped cross section, and at least one cooling fluid inlet passage extending through the at least one flange structure to the cooling channel.

In further embodiments of the present disclosure, including further embodiments of the above exemplary embodiments, the at least one cooling fluid inlet passage extends through the length of the radial flange section from a top edge surface of the radial flange section to the cooling channel.

In further embodiments of the present disclosure, including further embodiments of the above exemplary embodiments, each of the two arms form a fillet at the connection region and the at least one cooling fluid inlet passage passes through at least one of the fillets.

In further embodiments of the present disclosure, including further embodiments of the above exemplary embodiments, the at least one flange structure extends perpendicular to the base.

In further embodiments of the present disclosure, including further embodiments of the above exemplary embodiments, the at least one flange structure extends from the base at an angle of 15° to 75°.

In further embodiments of the present disclosure, including further embodiments of the above exemplary embodiments, the at least one flange structure further comprises at least one cooling fluid outlet passage that extends from the cooling channel to the bottom inner surface of the base.

In further embodiments of the present disclosure, including further embodiments of the above exemplary embodiments, the base has a front edge, a back edge, and two side edges, and the cooling channel further comprises a cooling fluid outlet at at least one of the side edges of the base.

In further embodiments of the present disclosure, including further embodiments of the above exemplary embodiments, the component is a blade outer air seal (BOAS) segment.

In further embodiments of the present disclosure, including further embodiments of the above exemplary embodiments, a plurality of BOAS segments are arranged to form an annular shaped structure.

In further embodiments of the present disclosure, including further embodiments of the above exemplary embodiments, prior to densification, tooling or a fugitive material is positioned within the cooling cavity so as to preserve the shape of the cooling cavity during densification.

In further embodiments of the present disclosure, including further embodiments of the above exemplary embodiments, the at least one cooling fluid inlet passage is formed during layup by insertion of tooling or fugitive material into the preform, or by drilling the at least one cooling fluid inlet passage into the at least one flange structure after densification.

In further embodiments of the present disclosure, including further embodiments of the above exemplary embodiments, the at least one cooling fluid outlet passages is formed during layup by insertion of tooling or fugitive material into the preform, or by drilling the at least one cooling fluid inlet passage into the at least one flange structure after densification.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
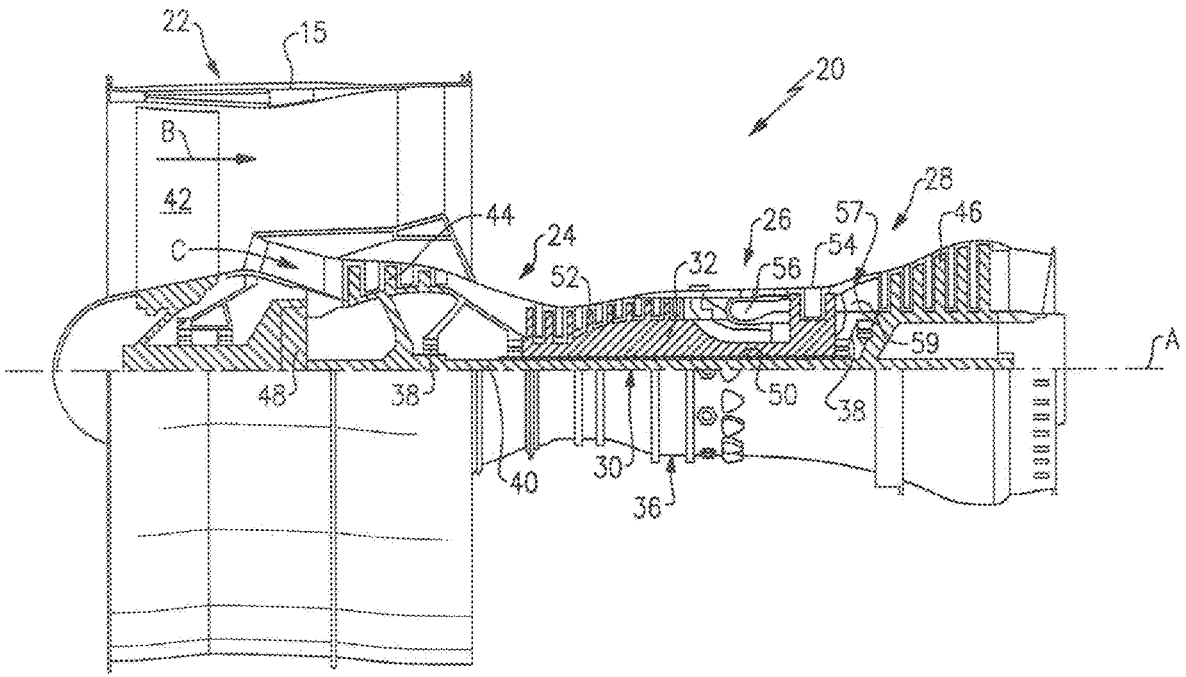
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

While the discussion below often makes reference to BOAS and BOAS segments, it should be recognized that the present disclosure is not limited to BOAS but includes any CMC component exhibiting a flange such as T-shaped flange.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces into the flow of the hot gases, i.e., faces upstream. The trailing edge/portion of a structure is the edge/portion that faces away from the flow of the hot gases, i.e., faces downstream.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine central longitudinal axis A which is positioned between an outer casing of the engine and the turbine blade(s) of the turbine section.

Figures 2, 3:
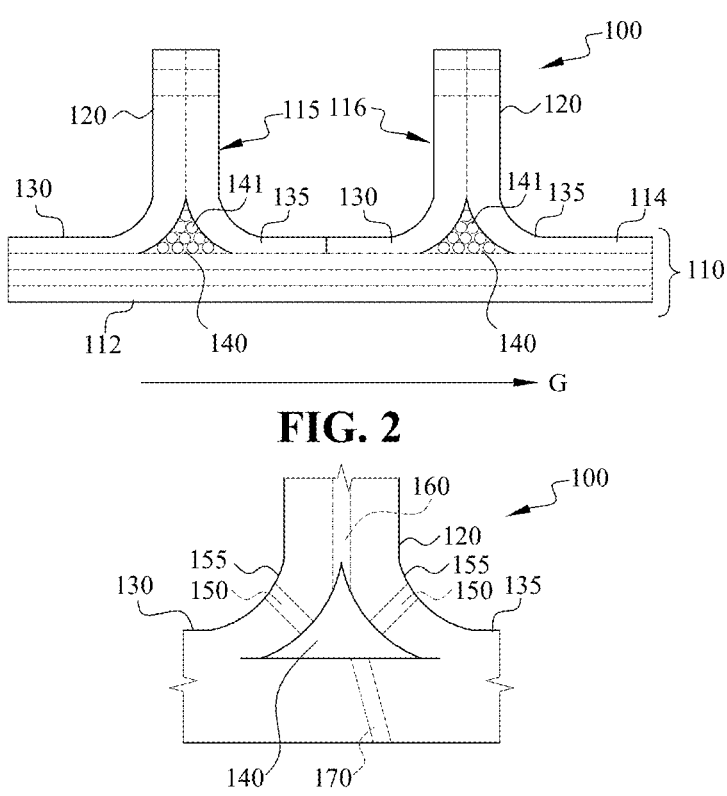
FIG. 2 is a schematic illustration of a cross section of blade outer air seal (BOAS) having T-shaped flanges without cooling cavities beneath the flange.
FIG. 3 is a schematic illustration of a cross section of a blade outer air seal (BOAS) having T-shaped flanges with cooling cavities beneath the flanges.

FIG. 2 illustrates a cross section of a BOAS segment 100. For context, line G represents the gaspath, i.e., the general flow path of hot gases through the turbine section. In this embodiment, the BOAS segment 100 includes a base 110 having a bottom inner surface 112 that faces the interior of the turbine section and is exposed to the flow of hot gases, and a top outer surface 114 that faces the outer casing of the engine. The BOAS segment 100 includes further includes two T-flanges 115 and 116 that extend radially, with respect to the longitudinal axis of the engine, from the outer surface 114 of the segment 100. These flanges 115 and 116 are load bearing features and provide structures for attaching the segment 100 to the outer casing of the engine.

In this BOAS segment, each flange is formed as a Y-weave of a plurality of ceramic fiber piles. The piles form a radial flange section 120 extending upward from the base 110. Within this radial flange section 120 the piles can be interwoven to reinforce and strengthen the flange. At the connection region between each radial flange section 120 and the base 110, the piles are bifurcated to form two arms 130 and 135 that are incorporated into the base of the BOAS segment. The bifurcation of the two arms 130 and 135 of ceramic fiber piles results in the formation of cavity 140 having a triangular shaped cross section below the radial flange section. In FIG. 2, to provide additional strength for the flange, cavity 140 is filled with ceramic material such as ceramic fibers 141 ("noodles") and, for this reason, is typically referred to as the noodle region.

As can be seen in FIG. 2, the region beneath the flanges 115 and 116 has a greater material thickness in comparison to other portions of the component. As noted above, these larger thicknesses render cooling more difficult and result in the formation of higher thermal gradients causing higher through-thickness and in-plane thermal stresses.

FIG. 3 illustrates a BOAS segment in accordance with an embodiment of the present disclosure. In this embodiment, the triangular shaped cavity 140 formed by the bifurcation of the two arms 130 and 135 is not filed with material but instead is utilized as a cooling cavity or cooling channel to facilitate cooling of the interior of the CMC component, i.e., in this case a BOAS segment. Thus, the cavity is defined on each of two sides by the plies of the two arms 130 and 135, which delimit two sides of the triangular cross section, and on the other side by plies of the base, which delimit the bottom of the triangular cross section.

To permit ingress of cooling fluid, one or more cooling fluid inlet passages are provided to allow external cooling fluid (e.g., cooling air) to enter into the cooling cavity positioned in the interior of the BOAS segment beneath the radial flange section 120.

For example, one of more cooling fluid inlet passages 150 can be formed through one or both fillet regions 155 of the T-flange to allow the cooling fluid to access the cooling cavity. Such cooling fluid inlet passages 150 can be made, for example, by drilling or other machining after densification. These cooling fluid inlet passages 150 extend from the outer surface of the segment 100, through a fillet region 155 of the flange, to the cooling cavity 180 within the interior of the base 110 of the BOAS segment. Alternatively or additionally, one of more cooling fluid inlet passages 160 can be formed through the radial flange section 120, for example, during the layup process, discussed below, to allow the cooling fluid to access the cooling cavity. These cooling fluid passages 160 that extend from a top edge (i.e., the distal end of the flange with respect to the longitudinal axis of the engine) of the radial flange section 120, down through the radial flange section 120, to the cooling cavity within the interior of the base 110 of BOAS segment 100.

To provide for egress of the cooling fluid, one or more cooling fluid outlet passages can be provided. For example, one or more cooling fluid outlet passages 170 can be formed at the inner surface of the segment 100, for example by drilling or other machining, to allow the cooling fluid to escape from the cooling cavity into the interior of the turbine section. By positioning the cooling fluid outlet passage at the inner surface, the escaping cooling fluid can form a gaspath film to aid in cooling the inner surface of the BOAS assembly.

The shape of the cooling fluid inlet passages and cooling fluid outlet passages can vary. By way of example, the cooling fluid inlet and outlet passages can be in the form cylindrical passages or slot-shaped passages.

Figure 4:
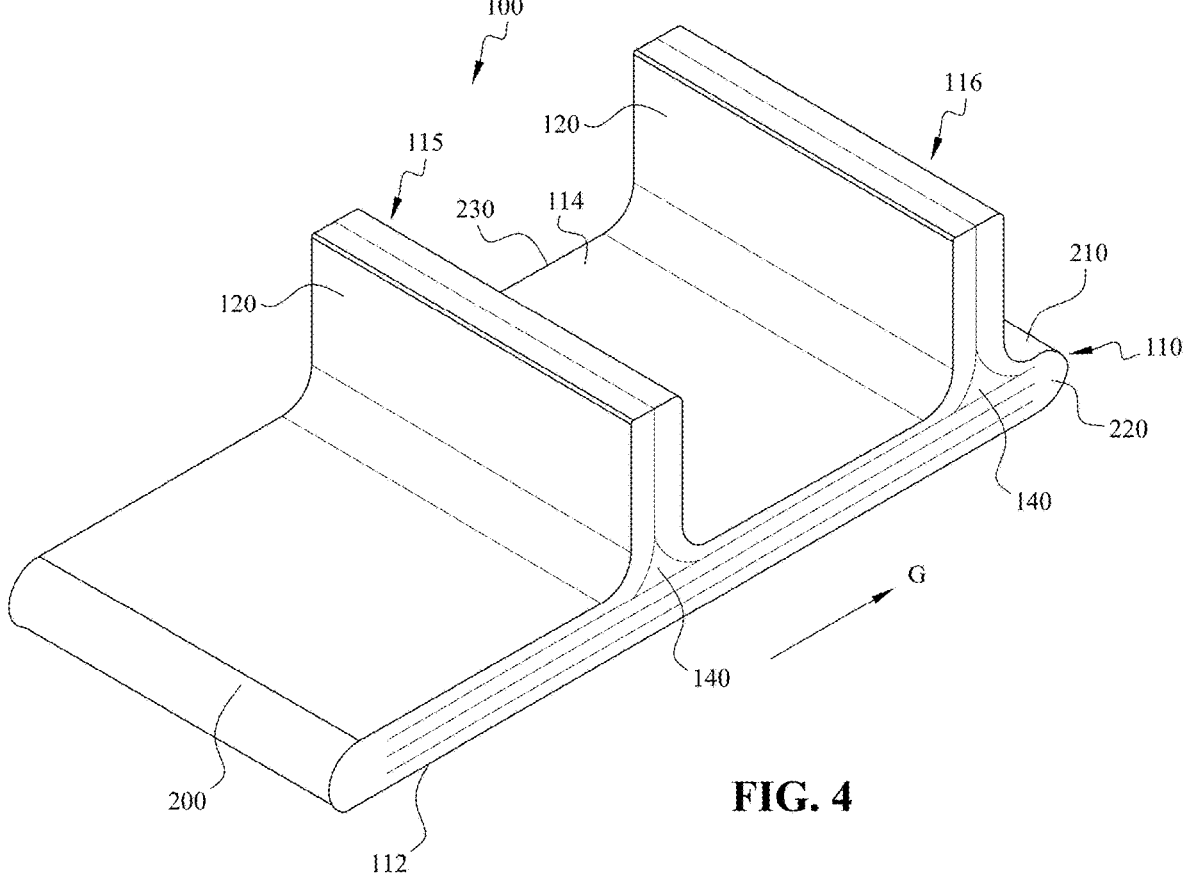
FIG. 4 is schematic illustration of a side view of a blade outer air seal (BOAS) segment having T-shaped flanges with cooling cavities beneath the flanges.

As an alternative, the cooling cavity of the can extend through to an edge of the BOAS segment 100 thereby provide an outlet to allow the cooling fluid to escape from the cooling cavity. FIG. 4 shows a side view of a BOAS segment in accordance with the present disclosure in which the cooling cavity 140 extends to an edge of the segment. As shown in FIG. 4, the base 110 can have an arcuate shape such that the bottom inner surface 112 and a top outer surface 114 are curved, i.e., inner surface 112 being concave and outer surface 114 being convex. The arcuate shape of the bases of the BOAS segments will permit the overall BOAS assembly to form an annular shroud between the outer casing of the engine and the blades of the turbine section.

The segment 100 has 4 edges, a front or leading edge 200, a back or trailing edge 210, and two side edges 220 and 230. In the BOAS assembly, the side edges 220 and 230, also called matefaces, will be proximate to side edges or matefaces of adjacent BOAS segments that make up the BOAS assembly. Allowing the cooling fluid to escape from the cooling cavity at the matefaces will provide a mateface purge stream which will facilitate cooling of the BOAS assembly.

As shown in FIG. 4, the base 110 can have an arcuate shape such that the bottom inner surface 112 and a top outer surface 114 are curved, i.e., inner surface 112 being concave and outer surface 114 being convex. The arcuate shape of the bases of the BOAS segments will permit the overall BOAS assembly to form an annular shroud between the outer casing of the engine and the blades of the turbine section.

In the embodiments shown in FIGS. 3 and 4, the radial flange section 120 is depicted as being perpendicular to the outer surface 114 of base of the CMC component. However, it should be recognized that the radial flange section can form an angle with the base that is less than 90°. For example, the radial flange section can form an angle with the base of about 15° to 75° or about 30° to 60° or about 45° to 75°.

The height of the cavities (i.e., in the radial direction) can vary and will also be dependent on the thickness of the base beneath the flange(s) in the CMC component. The minimum noodle cavity height can be defined by the fabric minimum bend radius plus the wall thickness of bifurcated section of the flange layup. For example, if the fabric has a 0.0175 inch minimum bend radius, and there are 2 of 0.01 inch thick plies in bifurcated section of the flange, the cavity height will be about 0.0375 inches. Alternatively, the bifurcated section layup thickness could be about 0.1 inches, which would result in a cavity height over about 0.1175 inches.

The CMC component with flange, e.g., BOAS segment, is prepared by laying up ceramic fiber piles to form a ceramic preform. The preform serves as the initial framework for creating CMC component. The fiber plies are made from ceramic fibers or fiber tows. The fibers (or filaments) or fiber tows may be twisted or untwisted, and may be arranged in woven, non-woven, braided, knitted or other known fiber architectures. The fiber tows can be woven into plies, and the plies are then laid up and shaped into a preform of the CMC component. Binders such as polyvinyl alcohol (PVA) or using polyvinyl butyral (PVB) can be used during this layup process to help hold the plies together.

The fibers/filaments used in the CMC preforms may be, for example, silicon carbide (SiC), carbon, mullite $(3Al_2O_3 \cdot 2SiO$ or $2Al_2O_3 SiO_2$ or combinations thereof), silicon nitride or aluminum oxide. The ceramic fibers may also be oxycarbide-, oxynitride-, carbonitride-, silicate-, boride-, phosphide-, or oxide-based fibers. In still further examples, the fibers are fully crystalline, partially crystalline, or predominantly amorphous or glassy. In one particular example, the fibers are silicon carbide (SiC) fibers.

After the CMC preform is formed by the layup, the preform can be subjected to densification to add matrix material to fill the remaining void space within the preform. This procedure stiffens and strengthens the woven plies of ceramic fiber tows to form the CMC. Thus, densification involves reducing the porosity within the preform, making it more solid and robust, by filing the remaining pores with the matrix material. The goal is to achieve a higher relative density, and ensure that the final CMC structure is compact and free of large voids.

Layup and densification can be a performed as two steps. The entire preform is first created and then the preform is densified. Alternatively, layup and densification can be a performed by a series of repeated steps. For example, an initial base of the component can be prepared by laying up plies of woven ceramic fiber tows and the subjected to densification. Once formed, the initial base is the wrapped in further plies of woven ceramic fiber tows, including Y-shaped plies that will form the flanges and their associated cooling cavities with triangular shaped cross sections as described above. The resultant structure is them subjected to a further densification to add matrix material to the added plies.

Various methods can be used to add the matrix material during densification. These include, but are not limited to, chemical vapor infiltration (CVI), chemical liquid-vapor deposition (CLVD), liquid silicon infiltration (LSI), and polymer infiltration and pyrolysis (PIP).

Chemical vapor infiltration (CVI) involves introducing gaseous precursors into the porous CMC preform. These precursors react at the surface of the fibers, depositing additional material and filling the voids. Chemical liquid-vapor deposition (CLVD) uses liquid precursors that vaporize and infiltrate the preform. The liquid-to-vapor conversion occurs at the fiber surface, leading to densification.

Liquid silicon infiltration (LSI) utilizes liquid silicon to infiltrate the CMC preform. Silicon reacts with carbon or other constituents of the CMC preform, forming a dense matrix.

In polymer infiltration and pyrolysis (PIP) a polymer precursor is infiltrated into the preform. The subsequent pyrolysis process converts the polymer into a ceramic matrix. During pyrolysis the matrix shrinks leading to microcracks, which require repeating the polymer and infiltration cycle multiple times.

Prior to densification, steps can be taken to retain the shape of structural features and/or to form structural features that will be retained following densification. For example, prior to densification appropriately shaped tooling can be inserted into the cooling cavity so as to preserve is shape (i.e., the triangular shaped cross section) and prevent matrix material from blocking the cooling cavity during densification. Alternatively, the cooling cavity can be filled with a fugitive material (such as graphite) that is subsequently removed after densification.

Also, the cooling fluid inlet and outlet passages can be formed during the layup process by positioning, e.g., insertion, of tooling or fugitive material (such as a polymeric material). For example, during layup a cooling fluid inlet passage can be formed in the radial flange section by insertion of a planar tooling or planar shaped fugitive material to form a cooling inlet passage in the form of a radial slot within the radial flange section. Similarly, cooling fluid inlet passages through the fillets or cooling fluid outlets passages at the bottom surface can be formed by insertion of appropriately shaped tooling or fugitive material. The tooling or fugitive material can then be removed after densification. For example, the fugitive material can be removed by the heating the composite to the melting temperature/vaporization temperature of the fugitive material or by use of an appropriate solvent to dissolve the fugitive material.

Alternatively, the cooling fluid inlet and outlet passages can be made following densification. For example, cooling fluid inlet passages can be drilled through the fillet regions to form a passage for the ingress of cooling fluid into the cooling cavity and/or cooling fluid outlet passages can be drilled through the bottom surface of the base to form a passage for the egress of cooling fluid out of the cooling cavity.

The present disclosure provides an efficient method for forming cooling cavities beneath radial flanges. These cooling cavities provide a means for effectively cooling the interior of CMC components exhibiting flanges and thereby reduce the formation of thermal gradients at regions of high thickness and in turn reduce through-thickness and in-plane thermal stresses.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A ceramic matrix composite (CMC) component comprising:
   a base having a bottom inner surface and a top outer surface, said base comprising a plurality of ceramic fiber piles,
   at least one flange structure extending from the top outer surface of the base at a connection region, said flange structure being formed from a Y-weave of a plurality of ceramic fiber piles and having a radial flange section extending upward from the top outer surface of the base and, at the connection region, two arms formed by bifurcation of the plurality of ceramic fiber piles of the Y-weave,
   a cooling channel beneath said at least one flange structure wherein the cooling channel is positioned at the connection region, the cooling channel having walls defined by the two arms of the Y-weave and plies of the base, said cooling channel having a triangular shaped cross section, and
   at least one cooling fluid inlet passage extending through said at least one flange structure to the cooling channel.

2. The CMC component according to claim 1, wherein said at least one cooling fluid inlet passage extends through the length of said radial flange section from a top edge surface of said radial flange section to said cooling channel.

3. The CMC component according to claim 1, wherein each of said two arms form a fillet at the connection region and said at least one cooling fluid inlet passage passes through at least one of the fillets.

4. The CMC component according to claim 1, wherein said at least one flange structure extends perpendicular to said base.

5. The CMC component according to claim 1, wherein said at least one flange structure extends from said base at an angle of 15° to 75°.

6. The CMC component according to claim 1, wherein said at least one flange structure further comprises at least one cooling fluid outlet passage that extends from said cooling channel to said bottom inner surface of said base.

7. The CMC component according to claim 1, wherein said base has a front edge, a back edge, and two side edges, and said cooling channel further comprises a cooling fluid outlet at at least one of said side edges of the base.

8. The CMC component according to claim 1, wherein said component is a blade outer air seal (BOAS) segment.

9. A BOAS assembly comprising a plurality of BOAS segments according claim 8, wherein said BOAS segments are arranged to form an annular shaped structure.

10. A method of forming a ceramic matrix composite comprising:
   laying up a plurality of ceramic fiber plies to form a base bottom inner surface and a top outer surface,
   providing a plurality of ceramic fiber plies that form at least one flange structure extending from the top outer surface of the base at a connection region, said flange structure being formed from a Y-weave of a plurality of ceramic fiber piles and having a radial flange section extending upward from the top outer surface of the base and, at the connection region, two arms formed by bifurcation of the plurality of ceramic fiber piles of the Y-weave, wherein the base and at least one flange structure form a ceramic matrix composite preform,
   providing a cooling channel beneath said at least one flange structure wherein the cooling channel is positioned at the connection region, the cooling channel having walls defined by the two arms of the Y-weave and plies of the base,
   subjecting the ceramic matrix composite preform to densification to form a ceramic matrix composite, and
   before or after the densification, providing at least one cooling fluid inlet passage extending through said at least one flange structure to the cooling channel.

11. The method according to claim 10, wherein said at least one cooling fluid inlet passage extends through the length of said radial flange section from a top edge surface of said radial flange section to said cooling channel.

12. The method according to claim 10, wherein each of said two arms form a fillet at the connection region and said at least one cooling fluid inlet passage passes through at least one of the fillets.

13. The method according to claim 10, wherein said at least one flange structure extends perpendicular to said base.

14. The method according to claim 10, wherein said at least one flange structure extends from said base at an angle of 15° to 75°.

15. The method according to claim 10, wherein said at least one flange structure further comprises at least one cooling fluid outlet passage that extends from said cooling channel to said bottom inner surface of said base.

16. The method according to claim 10, wherein said base has a front edge, a back edge, and two side edges, and said cooling channel further comprises a cooling fluid outlet at at least one of said side edges of the base.

17. The method according to claim 10, prior to densification, tooling or a fugitive material is positioned within the cooling cavity so as to preserve the shape of the cooling cavity during densification.

18. The method according to claim 10, wherein said at least one cooling fluid inlet passage is formed during layup by insertion of tooling or fugitive material into the preform, or by drilling said at least one cooling fluid inlet passage into the at least one flange structure after densification.

19. The method according to claim 15, wherein said at least one cooling fluid outlet passages is formed during layup by insertion of tooling or fugitive material into the preform, or by drilling said at least one cooling fluid inlet passage into the at least one flange structure after densification.

20. A gas turbine engine comprising:

a fan section, a compressor section, a combustion section, and a turbine section, said turbine section including at least one rotor and one or more turbine blade(s) extending radially outwardly from said at least one rotor;

a blade outer air seal assembly positioned between the one or more turbine blade(s) and an outer casing to the engine;

said blade outer air seal is formed of a plurality blade outer air seal segments, wherein each blade outer air seal segment comprises a base having a bottom inner surface and a top outer surface, said base comprising a plurality of ceramic fiber piles, at least one flange structure extending from the top outer surface of the base at a connection region, said flange structure being formed from a Y-weave of a plurality of ceramic fiber piles and having a radial flange section extending upward from the top outer surface of the base and, at the connection region, two arms formed by bifurcation of the plurality of ceramic fiber piles of the Y-weave, a cooling channel beneath said at least one flange structure wherein the cooling channel is positioned at the connection region, the cooling channel having walls defined by the two arms of the Y-weave and plies of the base, said cooling channel having a triangular shaped cross section, and at least one cooling fluid inlet passage extending through said at least one flange structure to the cooling channel.

\* \* \* \* \*